United States Patent
Kono

(10) Patent No.: US 11,970,567 B2
(45) Date of Patent: Apr. 30, 2024

(54) POLYOL COMPOSITION AND POLYURETHANE FOAM

(71) Applicant: Sanyo Chemical Industries, Ltd., Kyoto (JP)

(72) Inventor: Shoichiro Kono, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 488 days.

(21) Appl. No.: 17/265,886

(22) PCT Filed: Aug. 20, 2019

(86) PCT No.: PCT/JP2019/032382
§ 371 (c)(1),
(2) Date: Feb. 4, 2021

(87) PCT Pub. No.: WO2020/040117
PCT Pub. Date: Feb. 27, 2020

(65) Prior Publication Data
US 2021/0163666 A1 Jun. 3, 2021

(30) Foreign Application Priority Data
Aug. 22, 2018 (JP) .................................. 2018-155436

(51) Int. Cl.
*C08G 18/50* (2006.01)
*C08G 18/48* (2006.01)
*C08L 71/02* (2006.01)

(52) U.S. Cl.
CPC ....... *C08G 18/5024* (2013.01); *C08G 18/482* (2013.01); *C08L 71/02* (2013.01)

(58) Field of Classification Search
CPC .......... C08G 18/2027; C08G 18/2081; C08G 18/246; C08G 18/3271; C08G 18/40; C08G 18/482; C08G 18/4829; C08G 18/4833; C08G 18/5021; C08G 18/5024; C08G 18/632; C08G 18/72; C08G 18/7621; C08G 18/7664; C08G 18/7671; C08G 2101/00; C08G 2110/0025; C08G 2110/005; C08G 2110/0058; C08K 5/521; C08L 71/02; C08L 75/08
See application file for complete search history.

(56) References Cited

U.S. PATENT DOCUMENTS

| | | | |
|---|---|---|---|
| 4,042,537 A | 8/1977 | Dahm et al. | |
| 4,845,133 A | 7/1989 | Priester, Jr. et al. | |
| 5,068,280 A | 11/1991 | Pal et al. | |
| 5,397,810 A | 3/1995 | Ozaki et al. | |
| 2012/0226075 A1* | 9/2012 | Leutfeld | C08G 18/706 564/59 |
| 2016/0311965 A1 | 10/2016 | Shen et al. | |

FOREIGN PATENT DOCUMENTS

| | | |
|---|---|---|
| CA | 1328663 C | 4/1994 |
| CN | 105518049 A | 4/2016 |
| CN | 106103523 A | 11/2016 |
| EP | 0507173 A2 | 10/1992 |
| JP | S53-027693 A | 3/1978 |
| JP | S57-212235 A | 12/1982 |
| JP | H01-249748 A | 10/1989 |
| JP | H02-500109 A | 1/1990 |
| JP | H03106938 A | 5/1991 |
| JP | H03-160016 A | 7/1991 |
| JP | H03-285906 A | 12/1991 |
| JP | H11-035791 A | 2/1999 |
| JP | 2000-007748 A | 1/2000 |
| JP | 2007-016188 A | 1/2007 |
| JP | 2015-110739 A | 6/2015 |
| KR | 970015619 A | 4/1997 |
| WO | 2013148252 A1 | 10/2013 |
| WO | 2015038828 A1 | 3/2015 |
| WO | 2017216209 A1 | 12/2017 |

OTHER PUBLICATIONS

Mihail Ionescu, "Chemistry and Technology of Polyols for Polyurethanes, 2nd Edition, vol. 1", Chemistry and Technology of Polyols for Polyurethanes, vol. 1, Second Edition, 2016, 197-253 and a cover page.
Mihail Ionescu, "Chemistry and Technology of Polyols for Polyurethanes, 2nd Edition, vol. 1", Chemistry and Technology of Polyols for Polyurethanes, vol. 1, Second Edition, 197-253. (discussed in the spec).
International Search Report dated Nov. 26, 2019, issued for PCT/JP2019/032382.
Office Action dated Apr. 27, 2022, issued for Chinese Patent Application No. 201980054126.8 and English translation of the Search Report.

* cited by examiner

Primary Examiner — John M Cooney
(74) Attorney, Agent, or Firm — Locke Lord LLP; James E. Armstrong, IV; Nicholas J. DiCeglie, Jr.

(57) ABSTRACT

Provided is a polyol composition which has good dispersion stability of a polyuria resin contained therein and maintains a uniform appearance over time as well as during the production, and which can be reacted with polyisocyanate to obtain a polyurethane foam having excellent flame retardancy. The present invention pertains to a polyol composition that is used as a raw material for a polyurethane foam containing a urea group-containing reaction product having a compound (A), which has two primary amino groups and at least one polyalkyleneoxy chain (a) in the molecule, and a polyisocyanate (B) as essential raw materials, and being obtained by reacting the primary amino groups of the (A) with the isocyanate groups of the (B), wherein the polyalkyleneoxy chain (a) is a chain to which 1-100 moles of a C2-4 alkylene oxide have been added.

17 Claims, No Drawings

POLYOL COMPOSITION AND POLYURETHANE FOAM

TECHNICAL FIELD

The present invention relates to a polyol composition and a polyurethane foam prepared by reacting the polyol composition with a polyisocyanate component. More specifically, the present invention relates to a polyol composition comprising a polyurea resin having high dispersion stability, and a polyurethane foam having superior flame retardancy.

BACKGROUND ART

As a polyol that enhances the resin strength of polyurethane foam, polymer polyols containing various resins in polyols are known. As the resins contained in such polymer polyols, styrene/acrylonitrile resin, melamine resin, urethane resin, and urea resin are known (Non-Patent Document 1). Among such polymer polyols, those containing a urethane resin include polyisocyanate-polyadded polyols (PIPA polyols), and those containing a urea resin include urea-dispersed polyols (PHD polyols).

Polyurethane foam is required to have strict flame retardancy in addition to mechanical strength in such applications as building materials, automobile engine rooms, railway vehicles, and airplanes. However, among these polymer polyols, those containing a styrene/acrylonitrile resin have good settling stability of the styrene/acrylonitrile resin in the polyol, but they are not expected to be superior in flame retardancy. On the other hand, those containing a melamine resin, a urethane resin, or a polyurea resin can be expected to improve the flame retardancy of urethane foam, but are problematic in the settling stability of the respective resins in the polyol.

PRIOR ART DOCUMENT

Non-Patent Document

Non-Patent Document 1: CHEMISTRY AND TECHNOLOGY OF POLYOLS FOR POLYURETHANES, Volume 1, 2nd Edition, (published in 2016), pp. 197-253, Mihail Ionescu, published by Smithers Rapra Technology

SUMMARY OF THE INVENTION

Problems To Be Solved By The Invention

An object of the present invention is to provide a polyol composition that reacts with a polyisocyanate to afford a polyurethane foam that exhibits superior flame retardancy and superior strength properties. Further, another object is to provide a polyol composition that is so good in dispersion stability of the polyurea resin contained therein that it maintains its appearance uniform not only at the time of its production but also over time and does not allow the resin contained therein to separate due to its precipitation, aggregation, or settling.

Solutions to the Problems

The present invention is directed to a polyol composition (D) for use as a raw material for polyurethane foam, the polyol composition comprising a reaction product (C) having a urea group prepared from a compound (A) having two primary amino groups and at least one polyalkyleneoxy chain (a) in the molecule thereof and a polyisocyanate (B) as essential raw materials by reacting a primary amino group of the compound (A) with an isocyanate group of the (B), wherein the polyalkyleneoxy chain (a) is an adduct chain composed of 1 to 100 mol of an alkylene oxide having 2 to 4 carbon atoms; and a polyurethane foam (F) prepared by reacting a polyol component (G) comprising the polyol composition (D) with a polyisocyanate component (H).

Advantages of the Invention

The polyol composition of the present invention has high dispersion stability of the polyurea resin contained therein, and by using this as a polyol component, a polyurethane foam having high strength and high flame retardancy can be obtained.

MODE FOR CARRYING OUT THE INVENTION

The polyol composition (D) for use as a raw material for polyurethane foam of the present invention (this is also simply referred to as a polyol composition (D)) includes a reaction product (C) having a urea group prepared from a compound (A) having two primary amino groups and at least one polyalkyleneoxy chain (a) in the molecule thereof and a polyisocyanate (B) as essential raw materials by reacting a primary amino group of the compound (A) with an isocyanate group of the (B). The polyalkyleneoxy chain (a) is an adduct chain composed of 1 to 100 mol of an alkylene oxide having 2 to 4 carbon atoms.

The compound (A) contains two primary amino groups and at least one polyalkyleneoxy chain (a) in the molecule thereof. When the compound (A) contains no primary amino group, no urea group is formed, and when the compound (A) contains only one primary amino group, the molecular weight of the reaction product with the polyisocyanate (B) does not increase, so that only a little improvement in mechanical properties is achieved. On the other hand, when three or more primary amino groups are contained, the reaction product is three-dimensionally crosslinked to have an extremely large molecular weight and high viscosity, so that it becomes difficult to handle the reaction product as a polyol.

The polyalkyleneoxy chain (a) contained in the compound (A) is derived from an addition reaction of an alkylene oxide having 2 to 4 carbon atoms (that is, an adduct chain). Examples of the alkylene oxide having 2 to 4 carbon atoms include one or more species selected from the group consisting of ethylene oxide, propylene oxide and butylene oxide, and preferred are ethylene oxide and propylene oxide. These may be employed singly or as a combination of two or more species.

As the compound (A), a primary amino group-containing alkylene oxide adduct (A1) represented by the following formula (1) is preferred.

[Chemical Formula 1]

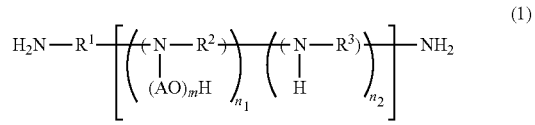

In the formula (1), $R^1$, $R^2$, and $R^3$ are each independently a linear or branched alkylene group having 1 to 4 carbon atoms, and when there is a plurality of $R^2$s, they may be the same or different from each other, and when there is a plurality of $R^3$s, they may be the same or different from each other. $n_1$ is an integer of 1 to 5, and $n_2$ is an integer of 0 to 5. AO represents an alkyleneoxy group having 2 to 4 carbon atoms, m represents the number of added moles of alkylene oxide attached to each of the $n_1$ nitrogen atoms, and each m in $n_1$ repetition is independently a number of 1 to 100.

Examples of each of $R^1$, $R^2$ and $R^3$ include a methylene group, an ethylene group, a propylene group, an isopropylene group, a butylene group, and an isobutylene group, and an ethylene group is preferred.

$n_1$ is an integer of 1 to 5, preferably an integer of 1 to 3, and more preferably 1 or 2. $n_2$ is an integer of 0 to 5, preferably an integer of 0 to 3, and more preferably 0.

The primary amino group-containing alkylene oxide adduct (A1) is prepared by adding an alkylene oxide to a polyamine compound. Examples of the polyamine compound include dialkylenetetramines, trialkylenetetramines and tetraalkylpentamines, and specific examples thereof include diethylenetriamine, dipropylenetriamine (norspermidine), dibutylenetriamine (spermidine), triethylenetetramine, tetraethylenepentamine, and tributylenetetramine (spermine). Diethylenetriamine and triethylenetetramine are preferred, and diethylenetriamine is particularly preferred.

Examples of the alkyleneoxy group having 2 to 4 carbon atoms in AO in the formula (1) include an oxyethylene group, an oxypropylene group, and an oxybutylene group, and an oxyethylene group and an oxypropylene group are preferred. These may be employed singly or as a combination of two or more species.

Each m in $n_1$ repetition is independently a number of 1 to 100, preferably 1 to 50, and more preferably 1 to 40.

The reaction of active hydrogen on the amino group of the polyamine with an alkylene oxide can occur on all amino groups in the molecule. Accordingly, the primary amino group-containing alkylene oxide adduct (A1) is required to be produced via a ketimine compound in which the primary amino group moiety is ketiminated to block in order to make the alkylene oxide react not with the terminal primary amino group but only with the secondary amino group. One example of a specific method for producing the primary amino group-containing alkylene oxide adduct (A1) is the method described in JP-A-01-249748.

The reaction product (C) in the present invention is prepared from the compound (A) and the polyisocyanate (B) as essential raw materials by reacting a primary amino group of the compound (A) with the isocyanate group of the polyisocyanate (B), and the polyisocyanate (B) is not particularly limited as long as it is a compound having two or more isocyanate groups in the molecule thereof. Examples of the polyisocyanate (B) include aromatic polyisocyanates (B1), aliphatic polyisocyanates (B2), alicyclic polyisocyanates (B3), aromatic aliphatic polyisocyanates (B4), and modified products thereof (B5). The (B) may be used singly or two or more species thereof may be used in combination.

The aromatic polyisocyanates (B1) include aromatic diisocyanates having 6 to 16 carbon atoms (excluding carbon atoms in NCO groups; the same applies to the number of carbon atoms of the following polyisocyanates), aromatic triisocyanates having 6 to 20 carbon atoms, crude products of these isocyanates, and mixtures of these isocyanates. Specific examples include 1,3- and/or 1,4-phenylenediocyanate, 2,4- and/or 2,6-tolylenediisocyanate (TDI), crude TDI, 2,4'- and/or 4,4'-diphenylmethane diisocyanate (MDI), polymethylene polyphenylene polyisocyanate (crude MDI, or polymeric MDI), and a mixture of TDI and polymeric MDI.

Examples of the aliphatic polyisocyanates (B2) include aliphatic diisocyanates having 6 to 10 carbon atoms. Specific examples include 1,6-hexamethylene diisocyanate and lysine diisocyanate.

Examples of the alicyclic polyisocyanates (B3) include alicyclic diisocyanates having 6 to 16 carbon atoms. Specific examples include isophorone diisocyanate (IPDI), 4,4'-dicyclohexylmethane diisocyanate, and norbornane diisocyanate.

Examples of the aromatic aliphatic polyisocyanate (B4) include aromatic aliphatic diisocyanates having 8 to 12 carbon atoms. Specific examples include xylylene diisocyanate and α, α, α', a'-tetramethylxylylene diisocyanate.

Examples of the modified polyisocyanate (B5) include urethane group-, carbodiimide group-, allophanate group-, urea group-, biuret group-, isocyanurate group, or oxazolidone group-containing modified products. Specific examples include urethane-modified MDI and carbodiimide-modified MDI.

Of these polyisocyanates (B), it is preferable to use the aromatic polyisocyanate (B1) and modified products thereof from the viewpoint of flame retardancy. The isocyanate group content of the polyisocyanate (B) is preferably 10 to 40% by weight.

The reaction product (C) itself has at least two hydroxyl groups.

The reaction product (C) prepared from the compound (A) and the polyisocyanate (B) as essential raw materials may contain, in addition to the compound (A), compounds having a hydroxyl group or amino group capable of reacting with the polyisocyanate (B) as long as they do not adversely affect the reaction between the compound (A) and the polyisocyanate (B), and among them, the compound having an amino group may be, for example, a compound having two primary amino groups but having no polyalkyleneoxy chain (a) in the molecule thereof, and the compound having a hydroxyl group may be, for example, a polyol (E) having no urea group, which will be described later.

The polyol composition (D) for use as a raw material for polyurethane foam of the present invention may further comprise a polyol (E) having no urea group in addition to the reaction product (C) having a urea group prepared by reacting the compound (A) with the polyisocyanate (B). It is preferable to make the polyol (E) to be contained when urea-reacting the compound (A) with the polyisocyanate (B) because a part of the polyol (E) reacts with the polyisocyanate (B) to further improve the dispersion stability of the urea resin.

Examples of the polyol (E) having no urea group in the present invention include polyols such as polyoxyalkylene polyols (E1) and polyester polyols (E2) having no urea group, and polymer polyols (E3) containing no urea group.

Examples of the polyoxyalkylene polyols (E1) includes polyhydric alcohols such as ethylene glycol, glycerin, propylene glycol, pentaerythritol, sorbitol, trimethylolpropane and sucrose; polyhydric phenols such as bisphenol A and bisphenol F; and compounds prepared from mixtures of the alcohols or phenols by adding an alkylene oxide (this may hereinafter be abbreviated as AO) to them. The AO to be added is preferably one having 2 to 4 carbon atoms, and examples thereof include propylene oxide (this may hereinafter be abbreviated as PO), ethylene oxide (this may hereinafter be abbreviated as EO), and butylene oxide. Two or more of them may be used in combination. Preferred are PO alone, EO alone, and a mixture of PO and EO. When two or more compounds are used in combination, the mode of addition may be either block or random.

Examples of the polyester polyol (E2) include polyester polyols of polyhydric alcohols [dihydric alcohols such as ethylene glycol, diethylene glycol, propylene glycol, 1,3- or 1,4-butanediol, 1,6-hexanediol, and neopentyl glycol; the aforementioned polyoxyalkylene polyol (E1) (especially, divalent polyether polyol); or mixtures thereof with trihydric or higher polyhydric alcohols such as glycerin and trimethylolpropane] with polycarboxylic acid such as adipic acid and sebacic acid, or an ester-forming derivative thereof [acid anhydrides such as maleic anhydride and phthalic anhydride, lower alkyl (having 1 to 4 carbon atoms) esters such as dimethyl terephthalate]; condensates of the aforementioned carboxylic acid anhydride with AO; AO (EO, PO, etc.)—adducts of the condensates; polylactone polyols obtained by ring-open polymerizing a lactone (ε-caprolactone, etc.) using a polyhydric alcohol as an initiator; and polycarbonate polyols obtained via a reaction between a polyhydric alcohol and an alkylene carbonate.

Naturally derived polyester polyols such as castor oil, castor oil derivatives, and mixtures thereof are also mentioned as the polyester polyol (E2).

Examples of the polymer polyol (E3) containing no urea group include styrene/acrylonitrile-based polymer polyol obtained by polymerizing styrene/acrylonitrile in a polyol, PIPA polyol prepared by performing a urethane reaction in a polyol, and melamine polyol prepared by polycondensing melamine and formaldehyde in a polyol.

The hydroxyl value (unit: mg KOH/g; the same applies hereinafter.) of the polyol (E) having no urea group is preferably 20 to 2,000. When the hydroxyl value is less than 20, the strength of the molded article described later is insufficient, and when the hydroxyl value exceeds 2,000, it becomes difficult to foam the urethane foam. The hydroxyl value is preferably 20 to 1,500, and more preferably 20 to 1,000. The hydroxyl value in the present invention is measured by the method specified in JIS K 0070 (1995 version). When there are two or three or more polyols, the hydroxyl value is an arithmetic mean value on weight basis of the hydroxyl values of the respective polyols.

The content of urea groups in the polyol composition (D) is 0.01 to 2.0 mmol/g, preferably 0.02 to 1.5 mmol/g, and more preferably 0.05 to 1.2 mmol/g, based on the weight of the (D). If the content of the urea group is less than 0.01 mmol/g, there is no effect on flame retardancy and strength, and if it exceeds 2.0 mmol/g, the viscosity of the compound is excessively high or stable dispersion in the polyol will be difficult.

The content of urea groups in the reaction product (C) is 0.02 to 6.0 mmol/g, preferably 0.05 to 4.0 mmol/g, and more preferably 0.1 to 2.0 mmol/g.

The polyol composition (D) containing a urea group for use as a raw material for polyurethane foam of the present invention is a polyol composition comprising a reaction product (C) having a urea group obtained by reacting the compound (A) with polyisocyanate (B). Preferably, the method for producing the polyol composition (D) of the present invention is a production method comprising the step of obtaining a polyol composition comprising a reaction product (C) having a urea group from a compound (A) having two primary amino groups and at least one polyalkyleneoxy chain (a) that is an adduct chain composed of 1 to 100 mol of an alkylene oxide having 2 to 4 carbon atoms, preferably the above-described primary amino group-containing alkylene oxide adduct (A1), and a polyisocyanate (B) as essential raw materials by reacting a primary amino group of the compound (A) with the isocyanate group of the (B).

The polyurethane foam (F) formed by reacting a polyol component (G) comprising the polyol composition (D) of the present invention with a polyisocyanate component (H) is prepared by, for example, placing the polyol component (G), the polyisocyanate component (H), and, if necessary, a urethanization catalyst (J), a foam stabilizer (I) described later, and a foaming agent (K) in a vessel, mixing them, and curing them by a urethane reaction.

As the polyisocyanate component (H) for obtaining the polyurethane foam (F), the same polyisocyanate as the above-described polyisocyanate (B) may be used.

The polyol component (G) for obtaining the polyurethane foam (F) comprises the polyol composition (D) and other polyols to be used as necessary. Examples of the other polyols to be used as necessary include the above-described polyol (E) having no urea group.

Where the ratio of the polyol component (G) to the polyisocyanate component (H) is expressed by an isocyanate index [(equivalent ratio of NCO groups/OH groups)×100], the index can be changed variously, and it is preferably 80 to 140, more preferably 85 to 120, and particularly preferably 90 to 115.

The reaction method of the polyol component (G) with the polyisocyanate component (H) may be either a one-shot method, or alternatively a prepolymer method wherein a part of the mixture of the (G) is reacted with the (H) in advance to form an NCO-terminated prepolymer and then the remainder of the (G) is reacted or a prepolymer method wherein the polyol component (G) is reacted with a part of the (H) in advance to form an OH-terminal prepolymer and then the remainder of the (H) is reacted.

As the urethanization catalyst (J) that can be used when the polyol component (G) and the polyisocyanate component (H) are subjected to a curing reaction, any ordinary urethanization catalyst that promotes a urethanization reaction can be used, and examples thereof include tertiary amines such as triethylenediamine, bis(N,N-dimethylamino-2-ethyl) ether, N,N,N',N'-tetramethylhexamethylenediamine, a PO adduct of N,N-dimethylaminopropylamine and carboxylates thereof; carboxylic acid metal salts such as potassium acetate, potassium octylate, and stannous octoate; and organometallic compounds such as dibutyltin dilaurate.

As the foam stabilizer (I) that can be used when the polyol component (G) and the polyisocyanate component (H) are subjected to curing reaction, any of those used in the production of ordinary polyurethane foam can be used. Specific examples thereof include dimethylsiloxane-based foam stabilizers ["SRX-253", "PRX-607", etc. manufactured by Dow Corning Toray Co., Ltd.], and polyether-modified dimethylsiloxane-based foam stabilizers ["SZ-1142", "SRX-294A", "SH-193", "SZ-1720", "SZ-1675t", "SF-2936F", "SZ-1346", "SF-2962", and "SZ-1327" manufactured by Dow Corning Toray Co., Ltd., "B8715LF2", "B8738LF2", "B8737", "B8742", and "B4900" manufactured by Degussa Japan Co., Ltd., and "L-540", "L-595", "L-3601", "L-3640", "L-5309", etc. manufactured by Momentive Performance Materials Inc.]. The amount of the foam stabilizer used is preferably 0.1 to 5.0 parts by weight, and more preferably 0.5 to 2.0 parts by weight, based on 100 parts by weight of the polyol component (G), from the viewpoint of mechanical properties, changes in mechanical properties over time, and discoloration of foam.

Examples of the foaming agent (K) that can be used when the polyol component (G) and the polyisocyanate component (H) are subjected to a curing reaction include water, hydrogen atom-containing halogenated hydrocarbons, low-boiling point hydrocarbons, and liquefied carbon dioxide. Two or more species thereof may be used in combination. When water is used singly as the foaming agent (K), the amount of the water used is 1.0 to 7.0 parts by weight, and more preferably 2.0 to 5.5 parts by weight, based on 100 parts by weight of the polyol component (G), from the viewpoint of moldability and mechanical properties of the polyurethane foam. The amount of the water used in combination with other foaming agents is preferably 1.0 to 5.5 parts by weight, and more preferably 2.0 parts by weight to 4.0 parts by weight, based on 100 parts by weight of the polyol component (G), from the viewpoint of the moldability and mechanical properties of foam.

Examples of the hydrogen atom-containing halogenated hydrocarbons include HCFC (hydrochlorofluorocarbon) type (e.g., HCFC-123, HCFC-141b, HCFC-22, and HCFC-142b); HFC (hydrofluorocarbon) type (e.g., HFC-134a, HFC-152a, HFC-356mff, HFC-236ea, HFC-245ca, HFC-245fa, and HFC-365mfc); and HFO (hydrofluoroolefin) type (e.g., HFO-1233zd (E) and HFO-1336mzz (Z)). From the viewpoint of the flammability of foam, the preferred ones among the above are HCFC-141b, HFC-134a, HFC-356mff, HFC-236ea, HFC-245ca, HFC-245fa, HFC-365mfc, HFO-1233zd (E), HFO-1336mzz (Z), and mixtures of two or more species of these.

When a hydrogen atom-containing halogenated hydrocarbon is used, the amount of the same used is preferably 50 parts by weight or less, and more preferably 5 to 45 parts by weight, based on 100 parts by weight of the polyol component (G), from the viewpoint of the moldability and mechanical properties of foam.

The low-boiling point hydrocarbons are hydrocarbons having a boiling point of −5 to 50° C., and specific examples thereof include butane, pentane, cyclopentane, and mixtures thereof. When a low-boiling point hydrocarbon is used, the amount of the same used is preferably 40 parts by weight or less, and more preferably 5 to 30 parts by weight, based on 100 parts by weight of the polyol component (G), from the viewpoint of the moldability and mechanical properties of foam.

When liquefied carbon dioxide is used, the amount of the same used is preferably 30 parts by weight or less, and more preferably 25 parts by weight or less, based on 100 parts by weight of the polyol component (G), from the viewpoint of the moldability and mechanical properties of foam.

The polyurethane foam (F) of the present invention may contain various additives (L) as necessary as long as the effects of the present invention are not impaired. Examples of such additives include dehydrating agents, lubricants, plasticizers, thixotropy agents, fillers, UV absorbers, anti-aging agents, antioxidants, colorants, flame retardants, fungicides, antibacterial agents, dispersants (anti-settling agents), defoaming agents, inorganic fillers, organic fillers, and microballoons. The amount of the additives added is usually 30% by weight or less, and preferably 20% by weight or less, based on the total weight of the polyol component (G) and the polyisocyanate component (H).

EXAMPLES

The present invention is further described below by means of Examples and Comparative Examples, but the present invention is not limited thereto. Hereafter, unless otherwise stated, "%" means "% by weight" and "part(s)" means "part(s) by weight".

Example 1

A stirring vessel having a capacity of 2 L was charged with 930.2 parts of a primary amino group-containing alkylene oxide adduct (A-1), which was then stirred at a liquid temperature of 25° C. and a rotation speed of 150 rpm for 15 minutes to mix uniformly. The stirring vessel was cooled, and while continuing stirring with the liquid temperature kept at 25° C., 69.8 parts of TDI (B-1) ["Coronate T-80" manufactured by Tosoh Corporation] was dropped over 30 minutes to complete a urea reaction. Thus, 1000 parts of a polyol composition (D-1) of the present invention was obtained.

Examples 2 to 7 and Comparative Example 1

The same operations as in Example 1 were carried out with the parts shown in Table 1, and thus, the polyol compositions (D-2) to (D-7) of Examples 2 to 7 and the polyol composition (D'-1) of Comparative Example 1 were obtained.

Comparative Example 2

A stirring vessel having a capacity of 2 L was charged with 800 parts of polyol (E-3), which was then stirred at a liquid temperature of 25° C. and a rotation speed of 150 rpm for 15 minutes to mix uniformly. Further, 48.4 parts of hydrazine monohydrate was added under the same conditions, and the mixture was stirred for 15 minutes to mix uniformly. Subsequently, 169 parts of Coronate T-80 (B-1) was added over 30 minutes while cooling the stirring vessel such that the liquid temperature could be maintained at 40 to 60° C. Then, dehydration was carried out under reduced pressure for 2 hours at a liquid temperature of 120° C., a rotation speed of 150 rpm and a reduced pressure of 30 mmHg, affording 1000 parts of a polyol composition (D'-2) of Comparative Example 2.

Comparative Example 3

A stirring vessel having a capacity of 2 L was charged with 800 parts of polyol (E-3), which was then stirred at a liquid temperature of 25° C. and a rotation speed of 150 rpm for 15 minutes to mix uniformly. Then, under the same conditions, 72.7 parts of triethanolamine and 0.1 part of a urethanization catalyst (J-6) [dibutyltin, "NEOSTANN U-100" manufactured by Nitto Kasei Co., Ltd.] were added, and the mixture was stirred for 15 minutes and mixed uniformly. Subsequently, the rotation speed was increased to 500 rpm, and then 123.7 parts of Coronate T-80 (B-1) was added over 10 seconds and stirring was continued for 120 seconds, affording 1000 parts of a polyol composition (D'-3).

The content of urea group (mmol/g), the hydroxyl value, and the viscosity at 25° C. of the polyol compositions (D-1) to (D-7) of Examples 1 to 7 and the polyol compositions (D'-1) to (D'-3) of Comparative Examples 1 to 3 are shown in Table 1. In addition, the appearance visually observed at 25° C. immediately after production and the appearance after storage at 25° C. for 30 days are shown in Table 1.

The compounds listed in Table 1 are as follows.

Primary amino group-containing alkylene oxide adduct (A-1): 3 mol-PO adduct of diethylenetriamine of chemical formula (1) where $R^1$ and $R^2$ are ethylene groups, $n_1$ is 1, $n_2$ is 0, and m is 3.

Primary amino group-containing alkylene oxide adduct (A-2): SANAMEEL TAP-10 [manufactured by Sanyo Chemical Industries, Ltd.], 10 mol-PO adduct of diethylenetriamine of chemical formula (1) where $R^1$ and $R^2$ are ethylene groups, $n_1$ is 1, $n_2$ is 0, and m is 10.

Primary amino group-containing alkylene oxide adduct (A-3): SANAMEEL TAP-40 [manufactured by Sanyo Chemical Industries, Ltd.], 40 mol-PO adduct of diethylenetriamine of chemical formula (1) where $R^1$ and $R^2$ are ethylene groups, $n_1$ is 1, $n_2$ is 0, and m is 40.

Primary amino group-containing alkylene oxide adduct (A-4): 1 mol-PO adduct of triethylenetetramine of chemical formula (1) where $R^1$ and $R^2$ are ethylene groups, $n_1$ is 2, $n_2$ is 0, and one m is 1, and the other m is 0.

Primary amino group-containing compound (A'-1): diethylenetriamine

Primary amino group-containing compound (A'-2): hydrazine monohydrate (manufactured by Kishida Chemical Co., Ltd.)

Urethanization catalyst (J-6): dibutyl tin, manufactured by Nitto Kasei Co., Ltd., "NEOSTANN U-100"

Polyol (E-1): SANNIX GP-250 [manufactured by Sanyo Chemical Industries, Ltd., PO adduct of glycerin, hydroxyl value: 673]

Polyol (E-2): SANNIX GP-400 [manufactured by Sanyo Chemical Industries, Ltd., PO adduct of glycerin, hydroxyl value: 400]

Polyol (E-3): SANNIX FA-725 [manufactured by Sanyo Chemical Industries, Ltd., PO/EO adduct of glycerin, hydroxyl value: 34]

Polyisocyanate (B-1): Coronate T-80 [2,4-toluene diisocyanate:2,6-toluene diisocyanate=8:2 mixture, manufactured by Tosoh Corporation, isocyanate group content: 48% by weight]

Polyisocyanate (B-2): Millionate MT [diphenylmethane diisocyanate, manufactured by Tosoh Corporation, isocyanate group content: 33.6% by weight]

TABLE 1

| Polyol composition (D) | | Example 1 (D-1) | Example 2 (D-2) | Example 3 (D-3) | Example 4 (D-4) | Example 5 (D-5) | Example 6 (D-6) | Example 7 (D-7) | Comparative Example 1 (D'-1) | Comparative Example 2 (D'-2) | Comparative Example 3 (D'-3) |
|---|---|---|---|---|---|---|---|---|---|---|---|
| Number of parts (parts by weight) | Primary amino group-containing alkylene oxide adduct (A) (A-1) | — | — | — | — | 124.3 | — | — | — | — | — |
| | (A-2) | — | 160.0 | — | — | — | 160.0 | — | — | — | — |
| | (A-3) | 930.2 | — | 180.5 | — | — | — | 186.0 | — | — | — |
| | (A-4) | — | — | — | 106.7 | — | — | — | — | — | — |
| | Primary amino group-containing compound (A'-1) | — | — | — | — | — | — | — | 75.8 | — | — |
| | (A'-2) | — | — | — | — | — | — | — | — | 48.4 | — |
| | Polyisocyanate (B) (B-1) | 69.8 | 40.0 | — | 93.3 | 75.7 | 40.0 | 14.0 | 124.2 | 169 | 127.3 |
| | (B-2) | — | — | 19.5 | — | — | — | — | — | — | — |
| | Polyol (E) (E-1) | — | — | — | — | 800 | — | — | — | — | — |
| | (E-2) | — | — | — | — | — | 800 | 800 | — | — | — |
| | (E-3) | — | — | 800 | 800 | — | — | — | 800 | 800 | 800 |
| | Amino alcohol Triethanolamine | — | — | — | — | — | — | — | — | — | 72.7 |
| | Urethanization catalyst (J) (J-6) | — | — | — | — | — | — | — | — | — | 0.1 |
| Content of urea group (mmol/g) in (D) | | 0.80 | 0.46 | 0.16 | 1.07 | 0.87 | 0.46 | 0.16 | 1.43 | 1.94 | 0 |
| Hydroxyl value (mg KOH/g) | | 54 | 52 | 37 | 30 | 560 | 330 | 310 | Gel-like and unmeasurable | 27 | 27 |
| Viscosity (mPas) at 25° C. | | 70,900 | 10,510 | 1,620 | 23,500 | 19,590 | 1,430 | 1,200 | Gel-like and unmeasurable | 4,000 | 5,000 |
| Appearance immediately after production | | Uniform and transparent | Uniform and opaque | Uniform and transparent | Uniform and opaque | Uniform and opaque | Uniform and transparent | Uniform and transparent | Non-uniform and gel-like substance separated | Uniform and opaque | Uniform and opaque |
| Appearance after storage at 25° C. for 30 days after production | | Uniform and transparent | Uniform and opaque | Uniform and transparent | Uniform and opaque | Uniform and opaque | Uniform and transparent | Uniform and transparent | Non-uniform and gel-like substance separated | Urea resin fine particles settled | Urethane resin fine particles settled |

As shown in Table 1, all of the polyol compositions of Examples 1 to 7 were uniform both immediately after their production and after 30 days, but in (D'-1) of Comparative Example 1, a gel-like substance was formed immediately after its production, so that the viscosity and the hydroxyl group could not be measured and it could not be evaluated as urethane foam. (D'-2) of Comparative Example 2 was uniform immediately after its formation, but fine particles of urea resin settled and separated after storage for 30 days. Similarly, (D'-3) of Comparative Example 3 was uniform immediately after its formation, but fine particles of urethane resin settled and separated after storage for 30 days.

As is clear from Table 1, the appearance of all the polyol compositions (D-1) to (D-7) of Examples 1 to 7 of the present invention was uniform not only immediately after their production but also after their storage at 25° C. for 30 days after their production, and they did not form precipitation of gel-like substances or settling of fine particles. On the other hand, the appearance of the polyol composition (D'-1) of Comparative Example 1, where diethylenetriamine was used instead of the alkylene oxide adducts of polyamine, was non-uniform immediately after its production, and a gel-like substance separated. Further, the so-called PHD polyol (D'-2) of Comparative Example 2 became non-uniform due to the settling of urea resin particles after its storage for 30 days after its production, and the so-called PIPA polyol (D'-3) of Comparative Example 3 became non-uniform after its storage for 30 days after its production due to the settling of urethane resin particles.

Production of Polyurethane Foam (F) with Formulation for Soft Foam

Example 8

The polyol composition (D-1) prepared in Example 1, the polyol composition (D-3) prepared in Example 3, the polyol (E-3), the polyol (E-4), the polyol (E-5), a foam stabilizer (I-1) ["TEGOSTAB B8738LF2" manufactured by Goldschmidt], a urethanization catalyst (J-1) ["DABCO-33LV" manufactured by Air Products Japan, Inc.], a urethanization catalyst (J-2) ["TOYOCAT ET" manufactured by Tosoh Corporation], and water (K-1) as a foaming agent were put into a 1 L cup in the amounts shown in Table 2, and were stirred with a mixer at a rotation speed of 3000 RPM for 60 seconds to mix uniformly. Polyisocyanate (H-1) was added to the resulting mixed liquid, and the mixture was immediately stirred with a mixer at a rotation speed of 3000 RPM for 10 seconds, and poured into a 30 cm×30 cm×10 cm mold whose temperature had been adjusted to 70° C. to cure for 10 minutes. Thus, polyurethane foam (F-1) of Example 8 was obtained.

Examples 9 to 12 and Comparative Examples 4 to 6

Polyurethane foams (F-2) to (F-5) of Examples 9 to 12 and polyurethane foams (F'-1) to (F'-3) of Comparative Examples 4 to 6 were obtained in the same manner as in Example 8 with the number of parts shown in Table 2.

The compounds listed in Table 2 but not listed in Table 1 are as follows.

Polyisocyanate (H-1): Coronate 1021 [TDI-80 (2,4- and 2,6-TDI, 2,4-form ratio is 80%/crude MDI=80/20 mixture (weight ratio), manufactured by Tosoh Corporation, isocyanate group content=44.6% by weight Polyisocyanate (H-2): Millionate MR-200 [Polymeric MDI, manufactured by Tosoh Corporation, isocyanate group content: 31.5%]

Polyol (E-4): SANNIX SP-750 [manufactured by Sanyo Chemical Industries, Ltd., PO adduct of sorbitol, hydroxyl value: 490]

Polyol (E-5): SANNIX FA-177 [manufactured by Sanyo Chemical Industries, Ltd., PO/EO adduct of glycerin, hydroxyl value: 25]

Polyol (E-6): SANNIX KC-900 [manufactured by Sanyo Chemical Industries, Ltd., acrylonitrile-based polymer polyol, polymer concentration: 34% by weight, hydroxyl value: 22]

Foam stabilizer (I-1): "TEGOSTAB B8738LF2" manufactured by Goldschmidt

Urethanization catalyst (J-1): "DABCO-33LV" manufactured by Air Products Japan, Inc. (33% by weight solution of triethylenediamine in dipropylene glycol)

Urethanization catalyst (J-2): "TOYOCAT ET" manufactured by Tosoh Corporation (70% by weight solution of bis (dimethylaminoethyl) ether in dipropylene glycol)

Foaming agent (K-1): water

Flame Retardant (L-1): [DAIGUARD 880 (non-halogen condensed phosphoric acid ester)] manufactured by Daihachi Chemical Industry Co., Ltd.

For the polyurethane foams (F-1) to (F-5) and (F'-1) to (F'-3) prepared in Examples 8 to 12 and Comparative Examples 4 to 6, foam density, 25% compression hardness, 50% compression hardness, C hardness, and flame retardancy were measured by the following methods. The results are shown in Table 2.

<Foam Density>

The foam density ($kg/m^3$) was measured in accordance with JIS K 6400.

<Compression Hardness>

A 25% compression hardness and a 50% compression hardness ($N/100 \, cm^2$) were measured in accordance with JIS K 6400 for low-density polyurethane foams, and a C hardness was measured in accordance with JIS K 7312 for high-density polyurethane foams.

<Flame Retardancy (Combustion Test)>

The flame retardancy was evaluated in accordance with the following FMVSS302 for low-density polyurethane foams, and the flame retardancy was evaluated in accordance with the following UL94V test method for high-density polyurethane foams.

(1) FMVSS302 Combustion Test Method

This test is a combustion test for automotive interior materials, which is known as the US Federal Automotive Safety Standard. Roughly, a 38 mm burner flame was applied to a sample from its right end for 15 seconds, and the combustion distance in a 254 mm length from the right end marker line A to the left end marker line B was measured. Judgment was made according to the following criteria.

Nonflammable: The test piece does not ignite or self-extinguishes before the A mark.

Self-extinguishing: Flames extinguish spontaneously within a combustion distance of 51 mm or less and a combustion time of 60 seconds or less.

Pass: Combustion speed of 102 mm/min or less.

Fail: The above criteria are not satisfied.

(2) UL94V Combustion Test Method

The flame retardancy was evaluated in accordance with the UL94V combustion test method (20 mm vertical combustion test), which is commonly used to evaluate the flame retardancy of resin materials. Judgment was made according to the following criteria.

V0: Every test piece exhibits a combustion distance of less than 125 mm and a combustion time of 10 seconds or less; the total combustion time of five test pieces is 50 seconds or less; and combustion drips do not ignite absorbent cotton.

V1: Every test piece exhibits a combustion distance of less than 125 mm and a combustion time of 30 seconds or less; the total combustion time of five test pieces is 250 seconds or less; and combustion drips do not ignite absorbent cotton.

V2: Every test piece exhibits a combustion distance of less than 125 mm and a combustion time of 30 seconds or less; the total combustion time of five test pieces is 250 seconds or less; and combustion drips ignite absorbent cotton.

Fail: The above criteria are not satisfied.

TABLE 2

| Polyurethane foam (F) | | | | Example 8 (F-1) | Example 9 (F-2) | Example 10 (F-3) | Example 11 (F-4) | Example 12 (F-5) | Comparative Example 4 (F'-1) | Comparative Example 5 (F'-2) | Comparative Example 6 (F'-3) |
|---|---|---|---|---|---|---|---|---|---|---|---|
| Number of parts (parts by weight) | Polyol component (G) | Polyol composition (D) | (D-1) | 25.0 | — | 70.0 | — | 50.0 | — | — | — |
| | | | (D-2) | — | 25.0 | — | 70.0 | — | — | — | — |
| | | | (D-3) | 5.0 | — | — | — | — | — | — | — |
| | | | (D-4) | — | 5.0 | — | — | — | — | — | — |
| | | | (D'-2) | — | — | — | — | — | — | 70.0 | — |
| | | | (D'-3) | — | — | — | — | — | — | — | 70.0 |
| | | Other polyols | (E-3) | 70.0 | 70.0 | 30.0 | 30.0 | 30.0 | 70.0 | 30.0 | 30.0 |
| | | | (E-4) | 1.0 | 1.0 | 20.0 | 20.0 | 20.0 | 1.0 | 20.0 | 20.0 |
| | | | (E-5) | 0.1 | 0.1 | 5.0 | 5.0 | 2.0 | 1.0 | 5.0 | 5.0 |
| | | | (E-6) | — | — | — | — | 30.0 | 20.0 | — | — |
| | Polyisocyanate component (H) | Polyisocyanate | (H-1) | 56.6 | 56.4 | — | — | — | 54.3 | — | — |
| | | | (H-2) | — | — | 77.7 | 77.4 | 76.0 | — | 73.1 | 73.1 |
| | Foam stabilizer (I) | | (I-1) | 0.8 | 0.8 | 0.8 | 0.8 | 0.8 | 0.8 | 0.8 | 0.8 |
| | Urethanization catalyst (J) | | (J-1) | 0.4 | 0.4 | 0.5 | 0.5 | 0.5 | 0.4 | 0.5 | 0.5 |
| | | | (J-2) | 0.3 | 0.3 | 0.1 | 0.1 | 0.1 | 0.3 | 0.1 | 0.1 |
| | Foaming agent (K) | | (K-1) | 4.7 | 4.7 | 2.8 | 2.8 | 2.8 | 4.7 | 2.8 | 2.8 |
| | Flame retardant (L) | | (L-1) | — | — | 20.0 | 20.0 | 20.0 | — | 20.0 | 20.0 |
| Evaluation results | Foam density (Kg/m$^3$) | | | 35.5 | 35.3 | 101 | 100 | 102 | 36.1 | 101 | 102 |
| | Compression strength | 25% Compression strength (N/100 cm$^2$) | | 143 | 115 | — | — | — | 154 | — | — |
| | | 50% Compression strength (N/100 cm$^2$) | | 300 | 280 | — | — | — | 285 | — | — |
| | | C hardness | | — | — | 35 | 34 | 35 | — | 35 | 30 |
| | Combustion test (F-MVSS 302) | | | Non-flammable | Self-extinguishing | — | — | — | Fail | — | — |
| | Combustion test (UL-94V) | | | — | — | V0 | V0 | V2 | — | Fail | Fail |

As is clear from Table 2, the low-density polyurethane foams of Examples 8 and 9 and the high-density polyurethane foams of Examples 10 to 12, which were produced with soft foam production formulations using the polyol compositions of the present invention, were high in compression strength and exhibited high flame retardancy in the FMVSS302 combustion test method or UL-94V combustion test method. On the other hand, the polyurethane foam (F'-1) of Comparative Example 4, which was produced using a common acrylonitrile-based polymer polyol without using the polyol composition (D) of the present invention failed in flame retardancy. Similarly, (F'-2) of Comparative Example 5, which was produced using the so-called PHD polyol (D'-2), and (F'-3) of Comparative Example 6, which was produced using the so-called PIPA polyol (D'-3), also failed in flame retardancy.

Production of Polyurethane Foam (F) with Formulation for Hard Foam

Example 13

The polyol composition (D-5) prepared in Example 5, the polyol (E-2), the foam stabilizer (I-2), a urethanization catalyst (J-3) ["POLYCAT 201" manufactured by Air Products Japan, Inc.], a urethanization catalyst (J-4) ["TOYOCAT DM-70" manufactured by Tosoh Corporation], a urethanization catalyst (J-5) ["DABCO K-15" manufactured by Air Products Japan, Inc.], water (K-1) and (K-2) ["Solstice LDA" manufactured by Honeywell] as foaming agents, and a flame retardant (L-2) (tris(chloropropyl) phosphate) were put into a 1 L cup in the amounts shown in Table 3, and were stirred with a mixer at a rotation speed of 3000 RPM for 60 seconds to mix uniformly. Polyisocyanate (H-2) was added to the resulting mixed liquid, and the mixture was immediately stirred with a mixer at a rotation speed of 3000 RPM for 10 seconds, and the mixed liquid was poured into a 40 cm×40 cm×20 cm mold made of corrugated cardboard, and then foamed. Thus, polyurethane foam (F-6) of Example 13 was obtained.

Examples 14 to 15

Polyurethane foams (F-7) to (F-8) of Examples 14 to 15 were obtained in the same manner as in Example 13 with the number of parts shown in Table 3.

The compounds listed in Table 3, excluding those described above, are as follows.

Urethanization catalyst (J-3): [POLYCAT201] manufactured by Air Products Japan, Inc.

Urethanization catalyst (J-4): [TOYOCAT DM-70] manufactured by Tosoh Corporation Urethanization catalyst (J-5): [DABCO K-15] manufactured by Air Products Japan, Inc.

Foaming agent (K-2): [Solstice LDA (HF0-1233zd (E)] manufactured by Honeywell 1

Flame retardant (L-2): [TMCPP (tris(chloropropyl) phosphate)] manufactured by Daihachi Chemical Industry Co., Ltd.

For the polyurethane foams (F-6) to (F-8) prepared in Examples 13 to 15, foam density, hardness, and flame retardancy were measured by the following methods. The results are shown in Table 3.

<Foam Density>
The foam density (kg/m$^3$) was measured in accordance with JIS K-7222.

<Hardness>
Compressive strength (N/mm$^2$) was measured in accordance with JIS K-7220.

<Flame Retardancy (Combustion Test)>
The combustion distance and the combustion time were evaluated in accordance with the JIS A 9511B method, which is commonly used to evaluate the flame retardancy of hard polyurethane foam for building materials. As hard polyurethane foam for building materials, a combustion distance of 50 mm or less and a combustion time of 60 seconds or less are generally required.

TABLE 3

| Polyurethane foam (F) | | | | Example 13 (F-6) | Example 14 (F-7) | Example 15 (F-8) |
|---|---|---|---|---|---|---|
| Number of parts (parts by weight) | Polyol component (G) | Polyol composition (D) | (D-5) | 50.0 | — | — |
| | | | (D-6) | — | 50.0 | — |
| | | | (D-7) | — | — | 50.0 |
| | | Other polyols | (E-2) | 50.0 | 50.0 | 50.0 |
| | Polyisocyanate component (H) | | (H-2) | 215.6 | 174.6 | 171.0 |
| | Foam stabilizer (I) | | (I-2) | 3.0 | 3.0 | 3.0 |
| | Urethanization catalyst (J) | | (J-3) | 0.5 | 0.5 | 0.5 |
| | | | (J-4) | 1.0 | 1.0 | 1.0 |
| | | | (J-5) | 1.0 | 1.0 | 1.0 |
| | Foaming agent (K) | | (K-1) | 2.0 | 2.0 | 2.0 |
| | | | (K-2) | 25.0 | 25.0 | 25.0 |
| | Flame retardant (L) | | (L-2) | 20.0 | 20.0 | 20.0 |
| Evaluation results | Foam density (Kg/m$^3$) | | | 33 | 33 | 33 |
| | Hardness | Compression strength (N/mm$^2$) | | 10.3 | 9.5 | 9.0 |
| | Combustion test (JIS A 9511B method) | Combustion distance (mm) | | 35 | 40 | 45 |
| | | Combustion time (seconds) | | 45 | 50 | 55 |

As is clear from Table 3, the polyurethane foams of Examples 13 to 15, which were produced with hard foam production formulations using the polyol compositions of the present invention, had high compressive strength, and exhibited superior flame retardancy in the combustion test method of JIS A 9511B method.

INDUSTRIAL APPLICABILITY

Since the polyol composition of the present invention is superior in the dispersion stability of the reaction product (C) having a urea group, it can be suitably used as a raw material for a general-purpose urethane foam. Further, since the urethane foam produced using the polyol composition of the present invention is high in strength and contains a reaction product (C) having a urea group with superior flame retardancy in a high concentration, it is particularly suitable for applications such as urethane resin-made engine covers, urethane seat cushions for railway vehicles, urethane seat cushions for transportation vehicles, and heat-insulating urethane boards for building materials, which are required to have high flame retardancy and high physical properties.

The invention claimed is:

1. A polyol composition for use as a raw material for polyurethane foam, the polyol composition comprising a reaction product (C) having a urea group prepared from a compound (A) having two primary amino groups and at least one polyalkyleneoxy chain (a) in a molecule thereof and a polyisocyanate (B) as essential raw materials by reacting a primary amino group of the compound (A) with an isocyanate group of the (B), wherein the polyalkyleneoxy chain (a) is an adduct chain composed of 1 to 100 mol of an alkylene oxide having 2 to 4 carbon atoms.

2. The polyol composition according to claim 1, wherein the compound (A) is a primary amino group-containing alkylene oxide adduct (A1) represented by following formula (1),

[Chemical Formula 1]

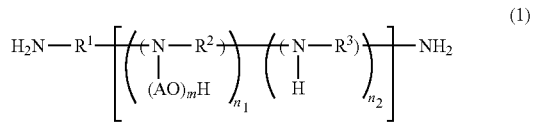

(1)

in the formula (1), $R^1$, $R^2$, and $R^3$ are each independently a linear or branched alkylene group having 1 to 4 carbon atoms, and when there are a plurality of $R^2$s or a plurality of $R^3$s, they each may be either the same or different, $n_1$ is an integer of 1 to 5, and $n_2$ is an integer of 0 to 5, AO represents an alkyleneoxy group having 2 to 4 carbon atoms, m represents the number of added moles of alkylene oxide attached to each of $n_1$ nitrogen atoms, and each m in $n_1$ repetition is independently a number of 1 to 100.

3. The polyol composition according to claim 1, wherein a content of the urea group is 0.01 to 2.0 mmol/g.

4. The polyol composition according to claim 2, wherein each m in $n_1$ repetition in the formula (1) is independently 1 to 50.

5. The polyol composition according to claim 2, wherein $R^1$ and $R^2$ in the formula (1) are ethylene groups.

6. The polyol composition according to claim 2, wherein $n_1$ in the formula (1) is an integer of 1 to 3.

7. The polyol composition according to claim 1, further comprising a polyol (E) having no urea group.

8. The polyol composition according to claim 7, wherein the polyol (E) having no urea group has a hydroxyl value of 20 to 2,000 mg KOH/g.

9. The polyol composition according to claim 2, wherein a content of the urea group is 0.01 to 2.0 mmol/g.

10. The polyol composition according to claim 3, wherein each m in $n_1$ repetition in the formula (1) is independently 1 to 50.

11. The polyol composition according to claim 3, wherein $R^1$ and $R^2$ in the formula (1) are ethylene groups.

12. The polyol composition according to claim 4, wherein $R^1$ and $R^2$ in the formula (1) are ethylene groups.

13. The polyol composition according to claim 3, wherein $n_1$ in the formula (1) is an integer of 1 to 3.

14. The polyol composition according to claim 4, wherein $n_1$ in the formula (1) is an integer of 1 to 3.

15. The polyol composition according to claim 2, further comprising a polyol (E) having no urea group.

16. The polyol composition according to claim 3, further comprising a polyol (E) having no urea group.

17. The polyol composition according to claim 15, wherein the polyol (E) having no urea group has a hydroxyl value of 20 to 2,000 mg KOH/g.

* * * * *